United States Patent [19]

Yamagata

[11] Patent Number: 4,637,110

[45] Date of Patent: Jan. 20, 1987

[54] METHOD FOR MAKING A COMPOSITE CYLINDER BLOCK

[75] Inventor: Hiroshi Yamagata, Iwata, Japan

[73] Assignee: Yamaha Hatsudoki Kabushiki Kaisha, Iwata, Japan

[21] Appl. No.: 704,535

[22] Filed: Feb. 22, 1985

[30] Foreign Application Priority Data

Feb. 24, 1984 [JP] Japan .................................. 59-33903

[51] Int. Cl.[4] .......................... B23P 15/00; B23P 17/00

[52] U.S. Cl. .............................. 29/156.4 WL; 29/412; 29/527.5; 29/DIG. 5; 29/DIG. 26; 164/98; 123/193 C

[58] Field of Search ............... 29/156.4 R, 156.4 WL, 29/412, 525, 527.5, DIG. 5, DIG. 26; 164/97, 98; 123/193 C; 83/188, 192, 193, 194

[56] References Cited

U.S. PATENT DOCUMENTS

| | | | |
|---|---|---|---|
| 1,990,558 | 2/1935 | Meyer | 29/156.4 WL |
| 3,069,209 | 12/1962 | Bauer | 29/156.4 WL |
| 3,772,946 | 11/1973 | Sarra | 83/188 X |
| 4,003,422 | 1/1977 | Schramm et al. | 164/98 X |

FOREIGN PATENT DOCUMENTS

| | | | |
|---|---|---|---|
| 699215 | 10/1940 | Fed. Rep. of Germany | 29/156.4 WL |
| 29365 | 9/1979 | Japan | 29/156.4 WL |
| 43233 | 3/1980 | Japan | 29/156.4 WL |
| 15741 | 1/1983 | Japan | 123/193 C |
| 155251 | 9/1984 | Japan | 123/193 C |

*Primary Examiner*—Howard N. Goldberg
*Assistant Examiner*—R. S. Wallace
*Attorney, Agent, or Firm*—Ernest A. Beutler

[57] ABSTRACT

YA two cycle internal combustion engine may be fabricated by employing an improved method for forming a composite cylinder block. The cylinder block includes liners which are cut from sections of cylindrical pipe and which are positioned in a cylinder block either by an insertion or casting step, the cylinder block is composed of a different material. Prior to the insertion, the port openings are formed by punching.

2 Claims, 4 Drawing Figures

METHOD FOR MAKING A COMPOSITE CYLINDER BLOCK

BACKGROUND OF THE INVENTION

This invention relates to a composite cylinder block and more particularly to an improved method for forming said cylinder blocks.

It is well known to form cylinder blocks for reciprocating machines such as internal combustion engines from dissimilar materials. Frequently, the cylinder block has a main body portion that is cast or otherwise formed from a lightweight material such as aluminum. However, to avoid the running of pistons of similar material (aluminum) directly on the bores of the main block, it has been the practice to use inserted liners formed from a harder material such as cast iron or the like. Various arrangements have been proposed for forming the cylinder liners and inserting them into the cylinder block. With the methods heretofore proposed, however, it has been difficult to insure the proper alignment of the cylinder liner within the cylinder block. This is particularly true with two cycle engines wherein the liner is also formed with port openings. In addition, the press fitting of the cylinder liner into the cylinder block may cause distortion at times. The previously proposed methods also have been rather expensive to make, particularly considering their other shortcomings.

It is, therefore, a principal object of this invention to provide an improved method for forming a composite cylinder block.

It is a further object of this invention to provide an improved method for making cylinder blocks for two cycle engines wherein the ports of the cylinder block and cylinder liner can be accurately and effectively aligned in a low cost method.

SUMMARY OF THE INVENTION

This invention is adapted to be embodied in a method of making a composite cylinder block for an internal combustion engine or the like. The method comprises the steps of forming a cylinder liner from a cylindrical pipe section, forming at least one port opening in the cylinder liner and fixing the liner in a block of different material.

DETAILED DESCRIPTION OF THE PREFERRED EMBODIMENT

Figure 1:
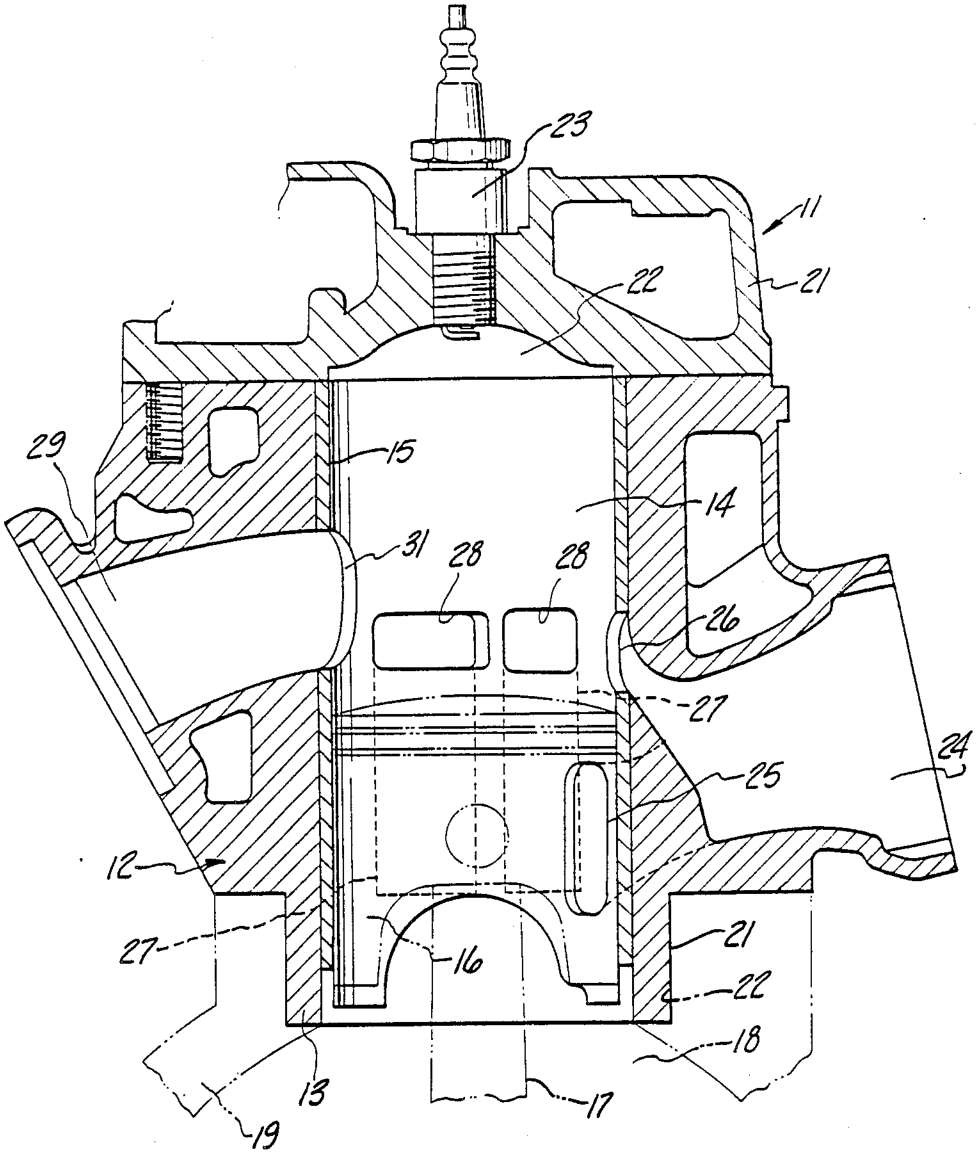
FIG. 1 is a cross-sectional view taken through the single cylinder of a two cycle internal combustion engine having a cylinder block constructed in accordance with the invention.

Referring first to FIG. 1, a single cylinder of a two cycle reciprocating type internal combustion engine is shown in cross-section and is identified generally by the reference numeral 11. Although the view is of only a single cylinder, it should be readily understood that the invention may be used with multi-cylinder engines of either the inline or V types. The engine 11 includes a cylinder block assembly, indicated generally by the reference numeral 12, and consisting of a main body portion 13, which may be formed from any suitable lightweight material such as aluminum or aluminum alloys and a cylinder liner 14 which is formed of a dissimilar material and, in a preferred embodiment of the invention, cast iron. The cylinder liner 14 is forced with a cylinder bore 15 in which a piston 16 is supported for reciprocation in a known manner. The piston 16 is connected by means of a connecting rod 17 to a crankshaft (not shown) that is rotatably journaled within a crankcase 18 formed by a crankcase casting 19. The cylinder block 12 has a pilot portion 21 that is received in a bore 22 formed in the crankcase casting 19.

A cylinder head 21 is affixed in a suitable manner to the cylinder block 12 and has a cavity 22 that is positioned above the cylinder bore 15 and which with the cylinder bore 15 and piston 16 form a chamber of varying volume which may be referred to at times as the combustion chamber. A spark plug 23 is supported in the cylinder head 21 and has its electrodes extending into the recess 22.

As is well known in two cycle engine practice, a fuel/air mixture is drawn into the crankcase chamber 18 from an intake passage 24 that extends through the cylinder block 12. The passage 24 terminates in a first intake port 25 that is adapted, at times, to communicate with the area below the piston 16 so that the fuel/air charge may enter the crankcase chamber 18. In addition, a port 26 may be further provided above the port 25 so as to induct a portion of the fuel/air charge directly into the combustion chamber 22 when the piston 16 is at its bottom dead center position.

As is known with this type of engine, downward movement of the piston 16 causes compression of the fuel/air charge in the crankcase chamber 18 and the compressed charge is transferred through scavenge ports 27 formed in the cylinder block 12 and which terminated in scavenge ports 28 that extend through the liner 14 to the combustion chamber 22. This fuel/air charge is fired by the spark plug 23 and is exhausted through one or more exhaust passages 29 that extend from exhaust ports 31 formed in the liner 14 for discharge to the atmosphere in a suitable manner.

Figure 2:
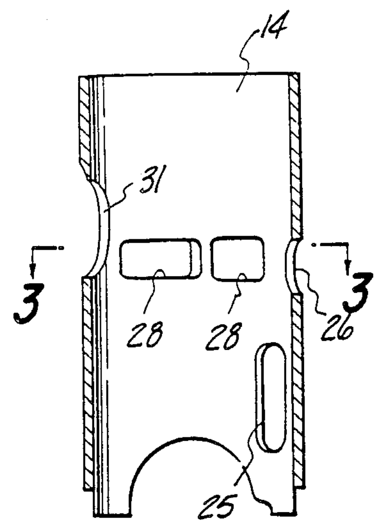
FIG. 2 is a reduced scale, cross-sectional view showing the cylinder liner.
Figure 3:
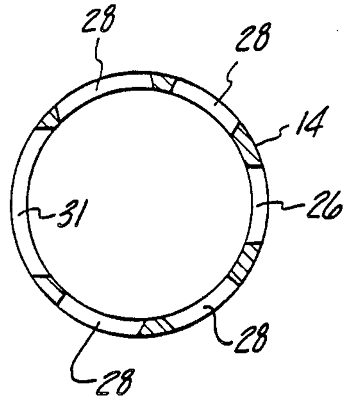
FIG. 3 is a cross-section view taken along the line 3—3 of FIG. 2.

The construction of the engine 11 as thus far described may be considered to be conventional. The invention resides in the manner in which the composite cylinder block 12 is formed. The cylinder liner 14 is formed from a length of pipe of cylindrical cross-section which may be cut to the desired length. The pipe in a preferred embodiment may be made of a suitable cast iron. FIGS. 2 and 3 show the section of pipe before insertion into the remainder of the cylinder block 13. The liner 14 is formed with the respective port openings 25, 26 and 28 in a suitable manner, preferably by punching in a radially inward direction. The same is true with respect to the exhaust port 31. By punching in this direction, the cross-sectional configuration of the respective port openings 25, 26, 28 and 31 will be of greater width at their radial inner peripheries as opposed to their radial outer peripheries as shown clearly in FIG. 3. As a result, a tapered edge will be configured which, if cast in place, will form an interlock between the cylinder block material 13 and the liner 14.

Figure 4:
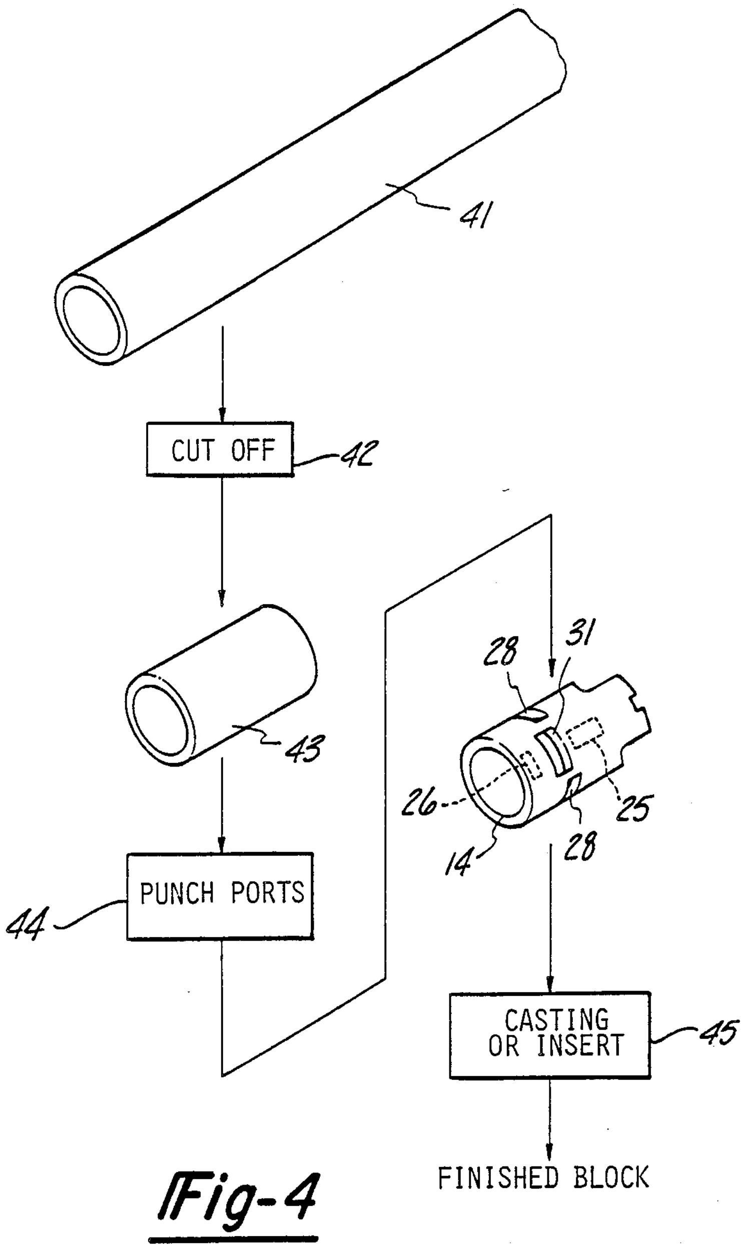
FIG. 4 is a schematic view showing the methods of forming the cylinder liner.

FIG. 4 shows the processing steps by which the cylinder liners 14 are formed. A length of cylindrical pipe of suitable wall thickness and bore 41 is cut at a cutoff step 42 into liner sections 43 of appropriate length. The liner lengths 43 are then punched by a punching operation which may take place in one or more steps as indicated by the block 44. In addition, suitable recesses may be formed at the bottom of the liner so as to provide the requisite porting between the inlets to the scavenge passages 28 and the communication with the intake port 25. The finished liner 14 is shown in this figure at the step following the punching step 44.

After the appropriate port openings have been formed in the liner 14, the liner is inserted into the cylinder block main portion 13. This may be done, as aforenoted, by pressing the liner 14 into an appropriate bore of the block casting 13. Alternatively, the liner 14 may be appropriately held in a mold, either sand or permanent, and the block portion 13 cast around it. As aforenoted, the inwardly tapering openings of the ports 25, 26, 28 and 31 will form a mechanical interlock which will help in accurately locating these openings and as well as insuring a good retention of the liner 14 within the block material 13. This insertion step is represented by the block 45 in FIG. 4. After the pouring step, the interior surface of the sleeve 14 may be finish surfaced by boring, honing or the like. Thus, a very good surface finish will be formed and the block construction may be formed in a very inexpensive and yet accurate manner.

Although an embodiment of the invention has been illustrated and described, it is to be understood that various changes and modifications may be made without departing from the spirit and scope of the invention, as defined by the appended claims.

I claim:

1. The method of making a composite cylinder block for an internal combustion engine or the like comprising forming a cylinder liner from a cylindrical pipe section, pre-forming by a punching operation at least one port opening in said cylinder liner, said punching operation being carried out from the outer diameter of the cylinder liner to its inner diameter for forming an inwardly tapered opening, and fixing said cylinder liner in a block of different material by casting the block of different material around the cylinder liner while the cylinder liner is held in place.

2. The method as set forth in claim 1 wherein a cast block material interlocks with the tapered opening of the cylinder liner.

* * * * *